United States Patent Office 3,262,334
Patented July 26, 1966

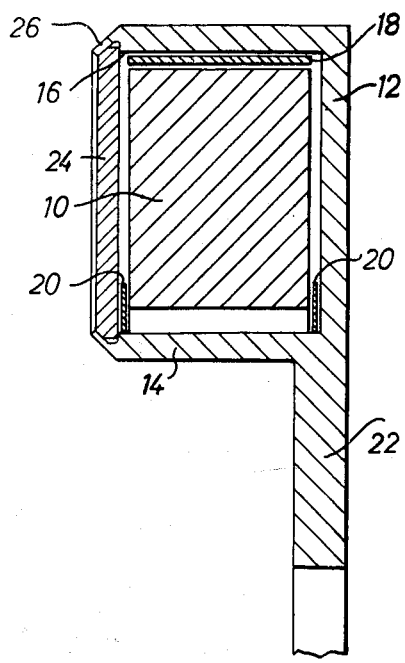
— FIG. 1 —
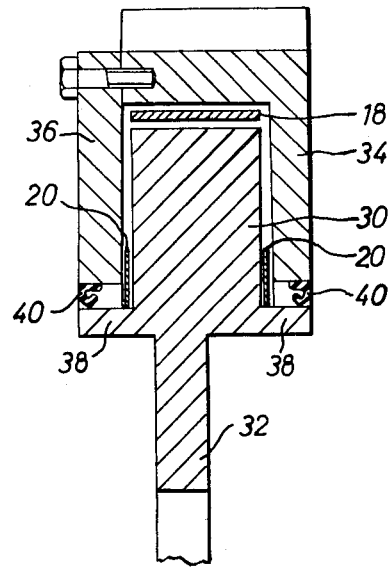
— FIG. 3 —
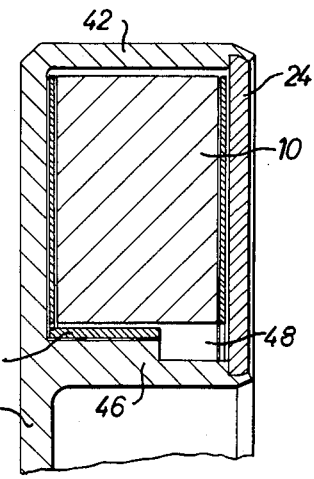
— FIG. 4 —
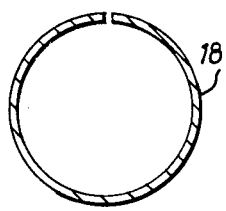
— FIG. 2 —

3,262,334
VISCOUS FRICTION DAMPERS
Maurice F. Edwards, Bolton, England, assignor to Hydrokin Limited, Bolton, England, a British company
Filed May 1, 1964, Ser. No. 364,124
Claims priority, application Great Britain, May 4, 1963, 17,728/63
5 Claims. (Cl. 74—574)

This invention concerns viscous friction dampers of the type employed for damping torsional vibrations and which comprise an annular slipping flywheel enclosed within a casing containing a viscous damping medium and adapted for securing to a rotatable shaft.

In dampers of this type, the spacing between the flywheel and at least some of the opposing surfaces of the casing is made so small that relative rotation between the two can occur only by overcoming the viscous drag exerted by the shear film of viscous fluid set up between them, so that the degree of damping achieved is a function of the said spacing and increases as the spacing is reduced. It will be appreciated, however, that in practice there is an ultimate limit below which this spacing cannot be reduced without risk of binding resulting from metal-to-metal contact of the relatively rotatable surfaces. For this reason, it has already been proposed to adhere, or press fit, or otherwise to secure a non-metallic lining to the relatively rotatable surfaces of a viscous friction damper, in order to obviate any possibility of metal-to-metal contact. In one particular prior construction, the non-metallic lining concerned is a soft lining such as cork which is adhered to the flywheel or to the casing but in practice cork linings have been found to crumble and disintegrate after only a relatively short time, leading to failure of the damper. In another prior construction, a damper is provided with a relatively hard, non-metallic lining which is secured to the flywheel or to the casing, and which is much more satisfactory in service. However, the necessity for actually securing these linings in their proper positions requires them to be prefabricated in a variety of configurations and sizes according to the dampers in which they are to be used, and, apart from the securing operation itself, involves additional machining operations to impart actual working dimensions to a lining when secured in position.

According to the present invention, a viscous friction damper of the type described is provided with a non-metallic journal bearing comprising a ring of non-metallic bearing material arranged in free floating relation between axially extended surfaces of the casing and the flywheel.

The bearing material is preferably a nylon-base material, which is chemically inert relative to the viscous damping fluid and which may be very accurately preformed to a required configuration and dimensions, thereby eliminating subsequent costly machining operations.

Alternatively, other thermosetting plastic or synthetic resins or polyester resins may be used, and so may a moulded or woven asbestos base fabric material such as is commonly used for clutch and brake linings, the essential requirements of the chosen material being a fine surface finish, a degree of natural resilience or flexibility, temperature stability, a reasonable hardness and the capability of being accurately moulded, at least to an accurately predetermined thickness.

Although a complete ring of bearing material may conveniently be interposed between the casing and the flywheel, it is preferred to employ a circumferentially discontinuous ring which, more especially where the bearing material has some natural flexibility and resilience, makes for an even simpler assembly of the damper, and readily accommodates itself to the location in which it is placed.

According to another feature of the invention, thrust bearing means for the damper may also comprise free floating rings of non-metallic bearing material arranged between the casing and flywheel end faces.

The invention will be described further by way of example, with reference to the accompanying drawings, in which:

FIG. 1 is an axial section through a part of one viscous friction damper embodying the invention, FIG. 2 is a section, to a reduced scale, through a non-metallic, cylindrical liner, and FIGS. 3 and 4 are sections through parts of the further dampers embodying the invention.

As shown in FIG. 1, an annular metal ring 10 constituting a flywheel or inertia member is arranged within an outer, enclosing metal casing 12 of which the inner annular wall 14 acts as a hub, an adequate clearance being left between the flywheel 10 and the hub 14. Between the outer periphery of the flywheel 10 and the facing, internal periphery 16 of the casing, there is interposed a circumferentially discontinuous ring 18 (FIG. 2) of a nylon-base material constituting a non-metallic journal bearing for the flywheel. The circular length of the bearing ring 18 is less than that of the flywheel circumference, so that by virtue of its natural resilience the ring 18, although freely located in the space between the casing 12 and the flywheel 10, can if necessary expand slightly to accommodate accumulated manufacturing tolerances arising in the fabrication of the flywheel. In this connection it is pertinent to note that, in the operation of the damper, with the spaces between the flywheel 10 and casing 12 filled with a damping fluid, usually a silicone oil, the cylindrical bearing 18 does not grip the outside diameter of the flywheel but, in effect, adopts a floating position between the flywheel and the casing. Relative slip therefore takes place between the flywheel 10 and the bearing 18 and between the bearing 18 and casing 12 and serves to reduce significantly the shear rate in the damping fluid on both sides of the bearing. In consequence, the development of heat is very much less than in constructions where the damping fluid is in direct shear between the casing and the flywheel, so that the viscosity of the damping fluid is not adversely affected by undue heat. This obviously has a beneficial physical effect upon the stability of operation of the damper, since the viscosity of the damping fluid remains more nearly constant over each individual period of operation, while from the long-term point of view, the lowered heat generation in the damping fluid avoids chemical degeneration of the latter, since it avoids the breakdown of the chemical bonds in the fluid molecules. Yet again, the lower operational temperatures prevailing in the damper of the invention discourage the bearing material from disintegrating and going into suspension in the damping fluid. Contamination of the damping fluid with consequent centrifuging of the dirt particles to the outside of the damper and risk of mechanical failure is thus substantially reduced.

The bearing ring 18 itself is very simply made from nylon-base material in strip form and of accurately predetermined thickness, which is merely cut into suitable lengths for insertion between the flywheel 10 and the casing 12 during assembly of the damper. It provides rubbing surfaces which are compatible with the damping fluid and because it may be so accurately moulded and has a naturally fine surface finish, obviates the need for machining fine surface finishes on the flywheel and casing. In these several ways, the bearing ring proposed by the invention achieves substantial economies in damper manufacture.

Thrust bearings 20 of the same non-metallic bearing material are also provided around the hub 14 of the damper casing, between the casing 12 and the opposing end faces of the flywheel 10, and are arranged in free-floating relation around the hub. Such thrust bearings comprise annular rings of relatively small radial depth, and are readily stamped from nylon-base material of accurately predetermined thickness.

It will be appreciated that a number of modifications may be made within the scope of the invention. Thus, while in FIG. 1 the damper is shown with the flywheel and annular casing axially offset relative to a mounting flange 22, and with the open end of the annular casing 12 closed by a plate 24, which is secured and sealed relative to the casing by a spun-over region 26 of the latter, FIG. 3 illustrates a more balanced arrangement, in which a more centrally situated flywheel 30 is additionally formed integrally with the mounting flange 32, and wherein the casing 34 comprises an end closure plate 36 which is bolted to the remainder of the casing. The flywheel and mounting flange component has axially extending flanges 38 between which and the casing are arranged fluid seals 40. A cylindrical, floating bearing 18 and thrust bearings 20 are provided, as in the embodiment of FIG. 1. Again, FIG. 4 shows a construction wherein the cylindrical journal bearing is arranged between the inside diameter of the flywheel and the hub, as an alternative to the arrangement of FIG. 1. Thus, in FIG. 4 the flywheel 10 is positioned within an annular casing 42 which is integral with a mounting flange 44 and which is closed by an end plate 24. The damper hub 46 is recessed to provide a reservoir 48, and a non-metallic journal bearing 50 is arranged between the hub 46 and the internal periphery of the flywheel 10, similarly to the bearing 18 of FIG. 1. Additionally, in the embodiment of FIG. 4, the thust bearings 52 are shown as being radially coextensive with the flywheel 10, in order to be capable of supporting sustained thrust loads during operation of the damper.

Although it will be appreciated that a wide range of non-metallic bearing materials is suitable for use in the invention, the preferred materials are the synthetic linear superpolyamides which have surfaces exhibiting a solid lubricant effect and which may be compounded to possess the required natural resilience. One example of such material is the nylon material sold by I.C.I. Ltd., under the trade name Nylon 66.

I claim:

1. A viscous friction damper comprising an annular casing, an annular slipping flywheel enclosed within said casing in close spaced relation with the interior surfaces of said casing, a viscous damping fluid in said casing, and a non-metallic journal bearing comprising a ring of non-metallic bearing material having inherent flexibility and resilience and arranged in free floating relation between axially extended surfaces of said flywheel and said casing.

2. A viscous friction damper comprising a casing securable to a rotary shaft and defining an annular chamber for a viscous damping fluid, a slipping flywheel in said chamber and a circumferentially discontinuous ring of non-metallic, flexible and resilient bearing material arranged in slipping relation between axially extended, facing surfaces of said flywheel and casing to constitute a journal bearing for said flywheel.

3. A viscous friction damper comprising a radially directed shaft mounting flange, means on said flange defining an annular fluid chamber at the radially outermost portion of said flange, an annular slipping flywheel in said chamber, a silicone damping fluid in said chamber in shear relation between opposed surfaces of said flywheel and said chamber, and a circumferentially discontinuous nylon bearing ring between axially extended, annular surfaces of said flywheel and said chamber, said ring having a circumferential length less than that of the flywheel annular surface with which it cooperates and conforming to the configuration of the annular clearance between said flywheel surface and the opposing chamber surface to thereby place said ring in slipping relation with both said flywheel and said chamber.

4. A damper as set forth in claim 3, further comprising radially directed, non-metallic thrust bearings arranged in free floating relation between the end faces of said flywheel and the corresponding faces of said chamber.

5. A damper as set forth in claim 4, wherein said thrust bearings are radially coextensive with said flywheel.

References Cited by the Examiner

UNITED STATES PATENTS

| | | |
|---|---|---|
| 2,240,111 | 4/1941 | Cox. |
| 2,966,074 | 12/1960 | Rumsey _____ 74—574 |
| 3,086,826 | 4/1963 | Gunnell. |
| 3,130,991 | 4/1964 | Piragino. |
| 3,200,485 | 8/1965 | McFarvern _____ 74—574 |

FOREIGN PATENTS

| | | |
|---|---|---|
| 1,016,068 | 8/1952 | France. |
| 1,101,870 | 8/1965 | Germany. |

BROUGHTON G. DURHAM, *Primary Examiner.*

W. S. RATLIFF, *Assistant Examiner.*